3,024,162
PHOSPHORIC ESTERS OF TERTIARY ALCOHOLS THAT HAVE AN ACETYLENIC FUNCTION, AND PESTICIDAL ACTIVITY
Giuseppe Losco and Cesare Augusto Peri, both of Milan, Italy, assignors to Montecatini Società Generale per l'Industria Mineraria e Chimica, Milan, Italy, a corporation of Italy
No Drawing. Filed Oct. 4, 1960, Ser. No. 60,301
Claims priority, application Italy Oct. 7, 1959
11 Claims. (Cl. 167—22)

The present invention relates to a group of new organophosphorus compounds and their application as pesticides.

The new compounds are dialkylphosphoric esters of tertiary alcohols having an acetylenic function.

They can be represented by the following general formula:

$$\begin{array}{c}RO\\ \diagdown\\ \phantom{RO}P-S-CH-COO-\overset{CH_3}{\underset{R''}{\overset{|}{C}}}-C\equiv CH\\ \diagup\parallel\phantom{P-S-CH}\phantom{|}\\ RO\phantom{\diagup}X\phantom{P-}R'\end{array}$$

in which R is ethyl, R' is hydrogen or phenyl, R'' is methyl or ethyl and X is oxygen or sulfur.

Tests of pesticidal activity carried out on substances belonging to the said general formula have shown that the presence of an acetylenic residue results in products that are surprisingly effective as insecticides.

The products having the above general formula in which R' is hydrogen have a specific action against the domestic fly and also show miticidal activity.

If R' is a phenyl radical the miticidal properties increase as specifically reported in the evaluation tables below.

The compounds are prepared by reacting alkaline salts of dialkylthiophosphoric or dialkyldithiophosphoric acids with monochloroacetic or monobromophenylacetic esters of tertiary alcohols having an acetylenic function, according to the following reaction scheme:

$$\begin{array}{c}RO\\ \diagdown\\ \phantom{RO}P-SMe + Halogen-CH-COOC-\overset{CH_3}{\underset{R''}{\overset{|}{C}}}-C\equiv CH\\ \diagup\parallel\phantom{P-SMe}\phantom{|}\\ RO\phantom{\diagup}X\phantom{P-}R'\end{array}$$

$$\downarrow$$

$$Me\ Halogen\ +\ \begin{array}{c}RO\\ \diagdown\\ \phantom{RO}P-S-CH-COO-\overset{CH_3}{\underset{R''}{\overset{|}{C}}}-C\equiv CH\\ \diagup\parallel\phantom{P-S-CH}\phantom{|}\\ RO\phantom{\diagup}X\phantom{P-}R'\end{array}$$

where R, R', R'' and X have the aforementioned meaning, Halogen is chlorine or bromine and Me is sodium or potassium. This reaction can be carried out in the presence of a suitable solvent or diluent, e.g. water, acetone, etc., at temperatures comprised between 10° and 50° C. The separation and purification of the end products can be carried out with the procedures normally adopted in the production of phosphoric esters. They will be illustrated in the specific examples.

The preparation of the monochloroacetic or monobromo-phenyl acetic esters of alcohols containing an acetylenic function, required for the above synthesis, is carried out in the presence of pyridine, and at low temperature, as is illustrated in Examples 1, 3, 5 and 7.

EXAMPLE 1

39.5 g. pyridine are added to a mixture of 42 g. of 3-methylbutine-1-ol-3 in 175 cc. of petroleum ether; 56.5 g. of chloroacetyl chloride are then introduced into the mixture agitated and cooled to 0° C. After agitation for 2 hours the mass is allowed to reach room temperature, the pyridine hydrochloride is filtered off and the upper layer is eliminated. The lower layer is washed with 350 cc. of an about 10% HCl solution, is extracted with carbon tetrachloride and then concentrated under vacuum. The residue is distilled at 15 mm./Hg. 25 g. of 3-methylbutine-1-ol-3 chloroacetate are collected.

This product is dissolved in 20 cc. acetone and agitated for 45 minutes at room temperature with a solution of 36.6 g. of the potassium salt of diethyldithiophosphoric acid in 80 cc. acetone. After drowning in 300 cc. of water and extraction with 100 cc. CCl₄, the solvent is evaporated and 36 g. of diethyldithiophosphorylacetic ester of 3-methylbutine-1-ol-3 are obtained. It is purified by distillation under a high vacuum, collecting the fraction which distills at 129–134° C., 0.4 mm./Hg (27 g.).

EXAMPLE 2

A solution of 250 g. of potassium diethyldithiophosphate in 60 cc. acetone is refluxed for 1 hour while agitating with 160 g. of 3-methylbutine-1-ol-3 chloroacetate, prepared as described in Example 1. After cooling, the mass is poured into 1 liter water; an oil separates which is washed with a 5% NaHCO₃ solution until neutral. The residue (237 g.) consists of the diethyldithiophosphorylacetic ester of 3-methyl-butine-1-ol-3; it has a titre of about 90%. It can be further purified by vacuum distillation, collecting the fraction which distills at 124–128°, 0.1–0.2 mm./Hg.

EXAMPLE 3

435 pyridine are added to a mixture of 490 g. of 3-methylpentine-1-ol-3 in 1200 cc. of petroleum ether; 565 g. chloroacetyl chloride are then introduced into the mixture agitated and cooled to 0° C. After agitation for 2 hours the mass is allowed to reach room temperature, the abundant pasty substance is filtered off and the filtrate is concentrated under reduced pressure. The residue is washed first with 2000 cc. of a 2% HCl aqueous solution and then subjected to 2 successive washing treatments with water and with a diluted NaHCO₃ solution until neutral. The washed product is then distilled under vacuum, collecting 225 g. of a fraction distilling at between 60° and 70° C. under 0.5 mm./Hg. The 3-methylpentine-1-ol-3 chloroacetate thus prepared is dissolved in 100 cc. acetone and is then refluxed for 1 hour with a solution of 346 g. of potassium diethyldithiophosphate in 700 cc. acetone. After cooling and drowning in 3 liters water, a water-insoluble product separates, which is washed till neutral reaction with a diluted NaHCO₃ solution.

300 g. of practically pure diethyldithiophosphorlyacetic ester of 3-methylpentine-1-ol-3 are obtained. The product can be distilled at 132–134° C. under 0.1 mm./Hg.

EXAMPLE 4

A solution of 40 g. of potassium diethyldithiophosphate in 100 cc. of acetone is agitated at 25° C. for 10 hours with 28 g. of 3-methylpentine-1-ol-3 chloroacetate prepared as described in Example 3. After drowning in water, extraction with CCl₄, washing until neutral in reaction, and evaporation of the solvent, 40 g. of diethylthiophosphorylacetic ester of 3-methylpentine-1-ol-3 are obtained. It can be vacuum distilled at 140° C. under 0.3 mm./Hg.

EXAMPLE 5

To a mixture of 336 g. of 3-methylbutine-1-ol-3 in 1000 cc. of petroleum ether, 332 g. of pyridine and then, at 0° C. under stirring, 1112 g. of bromide of alpha-bromophenyl acetic acid are added. The mass after agitation at 0° C. for 2 hours is filtered; the filtrate after concentration of the solvent, is agitated for 2 hours at 0° C. with 3 liters of water; 3-methylbutine-1-ol-3 bromophenylacetate is separated in the solid state and is centrifuged, thus obtaining 795 g. of a substance having a melting point of 37°–38° C.

562 g. of this substance are dissolved in 1200 cc. of acetone and are agitated for 18 hours at 25° C. with 900 cc. of an aqueous sodium diethyldithiophosphate solution having a concentration of 2.78 mols/liter. During this period the initially perfectly clear mixture becomes increasingly turbid until it separates into two layers; it is concentrated under about 50 mm./Hg at an inner temperature of 40° C. After addition of 1.5 liters of water, a heavy oil separates. This oil, after several washing treatments with water, solidifies and is separated by centrifugation at +5° C. A product which, after drying and washing with n-hexane, weighs 672 g. and has a melting point of 43–44° C., is obtained. It consists of the diethyldithiophosphorylphenylacetic ester of 3 - methylbutine - 1-ol-3.

EXAMPLE 6

A solution of 26 g. of potassium diethylthiophosphate in 80 cc. acetone is agitated for 10 hours at 25° C. with a solution of 30 cc. acetone and 28 g. of 3-methylbutine-1-ol-3 bromophenylacetate prepared as described in Example 5. After drowning in water, extraction with $CCl_4$, washing until neutral in reaction and evaporation of the solvent, 31.5 g. of the diethylthiophosphorylacetic ester of 3-methylbutine-1-ol-3 are obtained. It can be distilled at 175° C. under 0.8 mm./Hg.

EXAMPLE 7

To a mixture of 196 g. of 3-methylpentine-1-ol-3 in 500 cc. of petroleum ether, 162 g. of pyridine and, at 0° C. while agitating, 556 g. of bromide of alpha-bromophenylacetic acid are added. The mass after agitation for two hours at 0° C., is filtered. The filtrate is concentrated under vacuum and washed first with 800 cc. of 2% HCl, then with water and finally with a diluted $NaHCO_3$ solution. 443 g. of a raw product are obtained; this product is purified under a high vacuum; 395 g. of a fraction boiling at 126°–130° C. under 0.2 mm./Hg are collected. This fraction consists of 3-methylpentine-1-ol-3 bromophenylacetate. 295 g. of this ester are mixed with a solution of 250 g. of potassium diethylthiophosphate in 750 cc. acetone; the mixture is refluxed for 1 hour, washed and drowned in 5 liters of water. An oil is separated which after washing until netural in reaction with a diluted $NaHCO_3$ solution and then with water, weighs 340 g. and consists of the diethylthiophosphorylphenylacetic ester of 3-methylpentine-1-ol-3.

It can be distilled at 180° C. under 0.8 mm./Hg, with a little decomposition.

EVALUATION OF THE BIOLOGICAL ACTIVITY OF THE PRODUCTS OF THE ABOVE EXAMPLES

The products comprised in the general formula claimed in this patent application show interesting biological properties which render them practically useful for the pest control. The following application examples will illustrate said characteristics without limiting the scope of the present invention.

*Musca domestica* (domestic fly): Upon topic application, with a microsyringe, of an acetone solution of the products to be examined, on 5-day-old domestic flies, the percent average mortalities reported in Table 1A were obtained after 20 hours.

Upon tarsal application, by introducing 5-day-old female flies into beakers previously treated with controlled amounts of benzene solutions of the active substances to be examined, and letting them remain in contact for 20 hours, the mortalities reported in Table 1B were determined.

*Tetranicus telarius*: By nebulizing a mixed population of mites in different stages of growth on bean plants under standard conditions with an aqueous dispersion of the suitably formulated substances to be examined, the average mortalities reported in Table 2 were obtained.

Table 1

EVALUATION OF THE BIOLOGICAL ACTIVITY OF SOME COMPOUNDS

| | A—by topic application | | B—by tarsal contact | |
|---|---|---|---|---|
| | $\gamma$/fly | percent mortality | $Mg./m^2$ | percent mortality |
| (1) Diethyldithiophosphorylacetic ester of 3-methyl-butine-1-ol-3 | 0.5<br>0.4<br>0.3 | 88<br>73<br>45 | 5<br>1<br>0.75<br>0.5 | 100<br>71<br>58<br>20 |
| (2) Diethylthiophosphorylacetic ester of 3-methylbutine-1-ol-3 | 0.4<br>0.2<br>0.1<br>0.08 | 100<br>93<br>52<br>35 | | |
| (3) Diethyldithiophosphorylacetic ester of 3-methylpentine-1-ol-3 | 0.4<br>0.3<br>0.2 | 90<br>65<br>30 | 2<br>1<br>0.5<br>0.25 | 100<br>82<br>38<br>0 |
| (4) Diethylthiophosphorylacetic ester of 3-methylpentine-1-ol-3 | 0.4<br>0.2<br>0.1<br>0.08 | 100<br>93<br>40<br>20 | 5<br>1<br>0.5<br>0.25 | 100<br>98<br>51<br>0 |
| (5) Diethyldithiophosphorylphenyl-acetic ester of 3-methyl-butine-1-ol-3 | 0.6<br>0.5<br>0.4 | 73<br>48<br>15 | 5<br>2.5<br>1.25 | 91<br>63<br>18 |
| (6) Diethylthiophosphorylphenyl-acetic ester of 3-methyl-butine-1-ol-3 | 0.8<br>0.6<br>0.4 | 87<br>79<br>46 | 2<br>1<br>0.5<br>0.25 | 100<br>97<br>69<br>26 |
| (7) Diethylthiophosphorylphenyl-acetic ester of 3-methylpentine-1-ol-3 | 1.2<br>0.8<br>0.4 | 92<br>65<br>16 | 5 | 6 |

Table 2

| | Concentration percent active substance | Percent mortality after 16 days |
|---|---|---|
| Diethylthiophosphorylacetic ester of 3-methyl-pentine-1-ol-3 | 0.01<br>0.001<br>0.0006<br>0.00025<br>0.000125 | 100<br>97<br>93<br>83<br>37 |
| Diethyldithiophosphorylphenyl-acetic ester of 3-methylbutine-1-ol-3 | 0.0005<br>0.00025<br>0.000125<br>0.000062<br>0.000031 | 100<br>98<br>90<br>35<br>1 |
| Diethylthiophosphorylphenyl-acetic ester of 3-methylbutine-1-ol-3 | 0.002<br>0.001<br>0.0005<br>0.00025<br>0.000125 | 100<br>99<br>98<br>93<br>59 |
| Diethylthiophosphorylphenyl-acetic ester of 3-methylpentine-1-ol-3 | 0.01<br>0.001<br>0.0025<br>0.000125<br>0.000062 | 100<br>98<br>88<br>54<br>6 |

Table 3

DATA RELATING TO THE TOXICITY OF THE COMPOUNDS INDICATED IN TABLE 1 ON WARM-BLOODED ANIMALS

| Compound | LD 50 by oral administration, mg./kg. | LD 50 by intravenous administration, mg./kg. |
|---|---|---|
| 1 | 1 g./kg. does not cause mortality | 250 mg./kg. do not cause mortality. |
| 2 | 189 | 61. |
| 3 | 1 g./kg. gives 10% of mortality | 250 mg./kg. do not cause mortality. |
| 4 | 187 | 58. |
| 5 | 29 | 26. |
| 6 | 17 | 3.5. |
| 7 | 28 | 30. |
| Parathion | 8.2 | 5.7. |

The toxicity tests were carried out on white mice (½ male and ½ female individuals).

The active substances were used in solution in dimethylacetamide.

We claim:
1. Phosphoric esters of the formula:

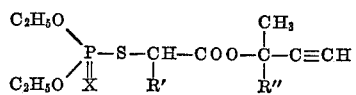

R' being taken from the group consisting of hydrogen and phenyl, R" being taken from the group consisting of methyl and ethyl and X being taken from the group consisting of oxygen and sulfur.

2. Diethyldithiophosphorylacetic ester of 3-methylbutine-1-ol-3.
3. Diethylthiophosphorylacetic ester of 3-methylbutine-1-ol-3.
4. Diethyldithiophosphorylacetic ester of 3-methylpentine-1-ol-3.
5. Diethylthiophosphorylacetic ester of 3-methylpentine-1-ol-3.
6. Diethyldithiophosphorylphenylacetic ester of 3-methylbutine-1-ol-3.
7. Diethylthiophosphorylphenylacetic ester of 3-methylbutine-1-ol-3.
8. Diethylthiophosphorylphenylacetic ester of 3-methylpentine-1-ol-3.
9. In the art of controlling insect pests, the improvement comprising applying, to the locality frequented by said pests, a compound of the formula:

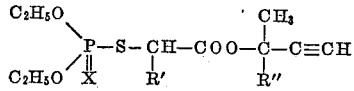

R' being taken from the group consisting of hydrogen and phenyl, R" being taken from the group consisting of methyl and ethyl and X being taken from the group consisting of oxygen and sulfur.

10. The process defined in claim 9, the pests being flies.
11. The process defined in claim 9, the pests being mites.

No references cited.